NORMAN T. GENERAL
STEPAS SMALINSKAS
ROBERT P. ZUNDEL
INVENTORS

ATTORNEYS

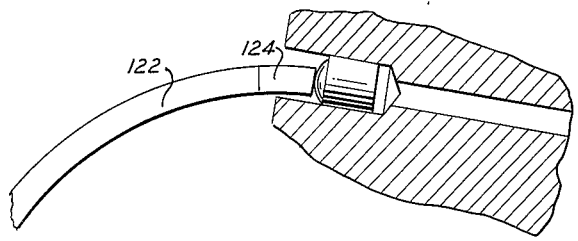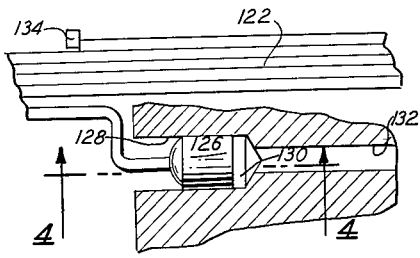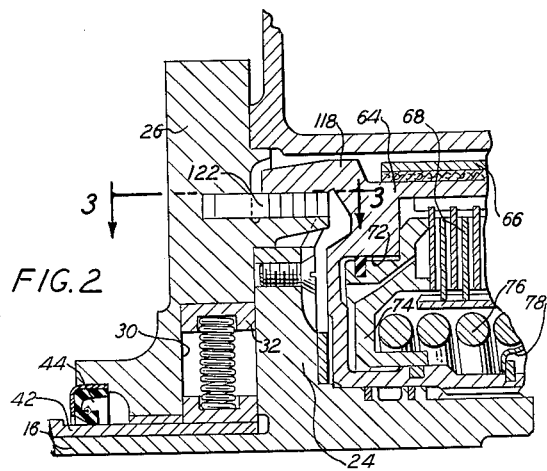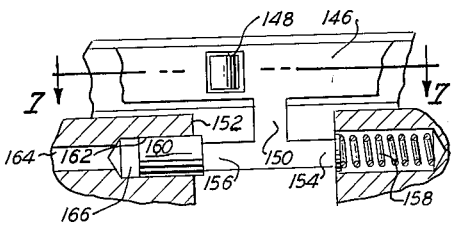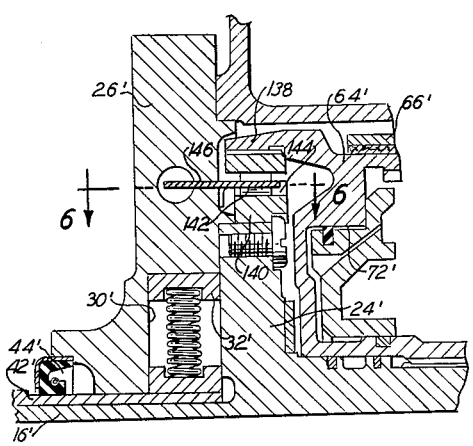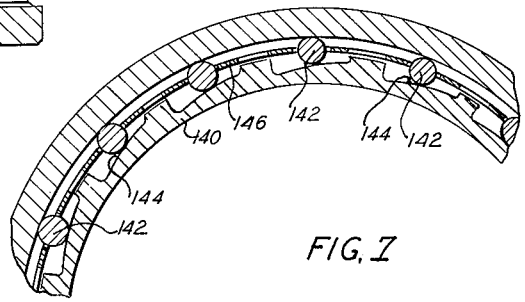

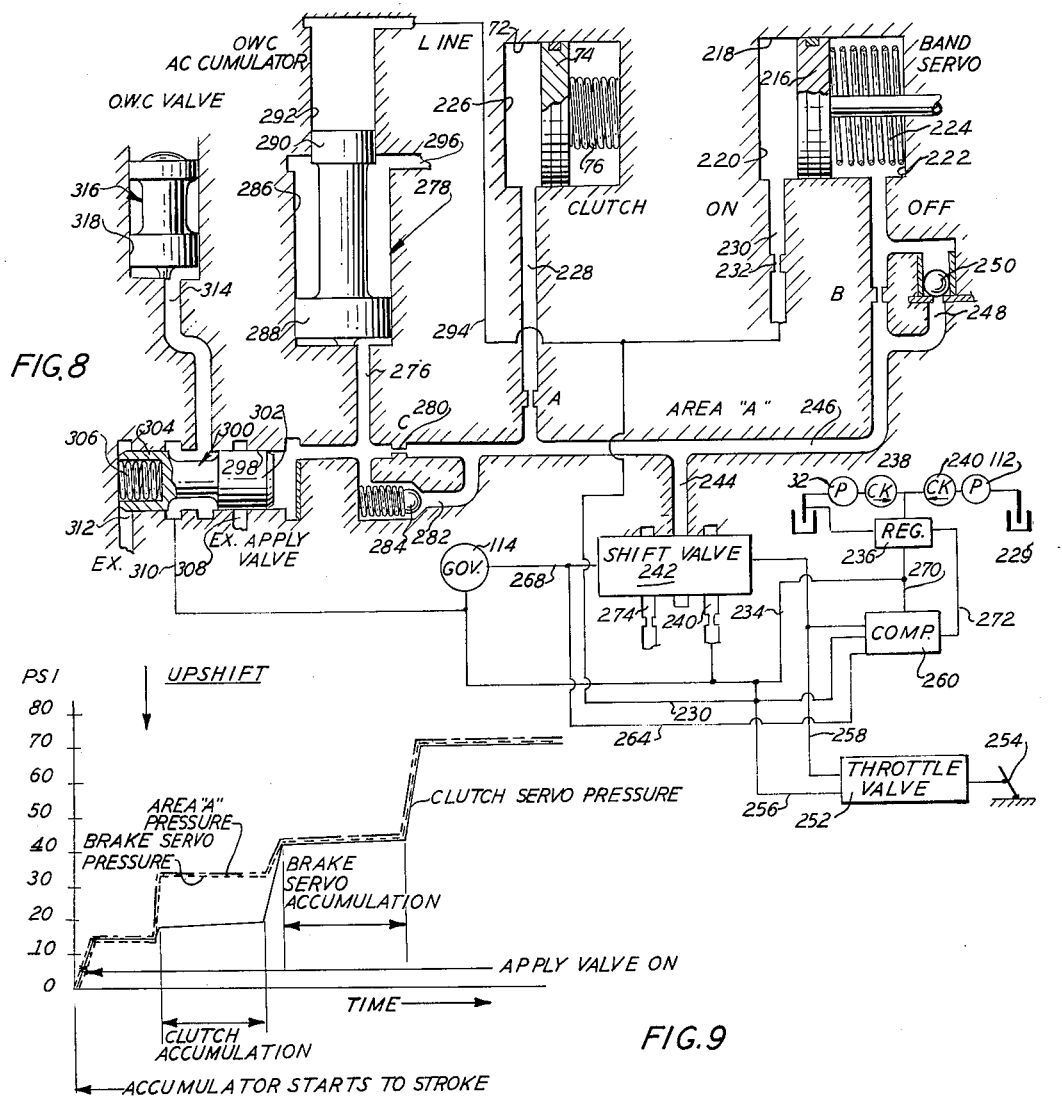
FIG. 8
FIG. 9
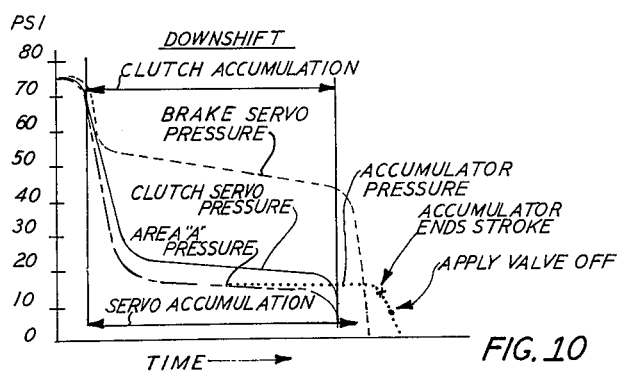
FIG. 10
NORMAN T. GENERAL
STEPAS SMALINSKAS
ROBERT P. ZUNDEL
INVENTORS
BY John L. Faulkner
Donald J. Harrington
ATTORNEYS

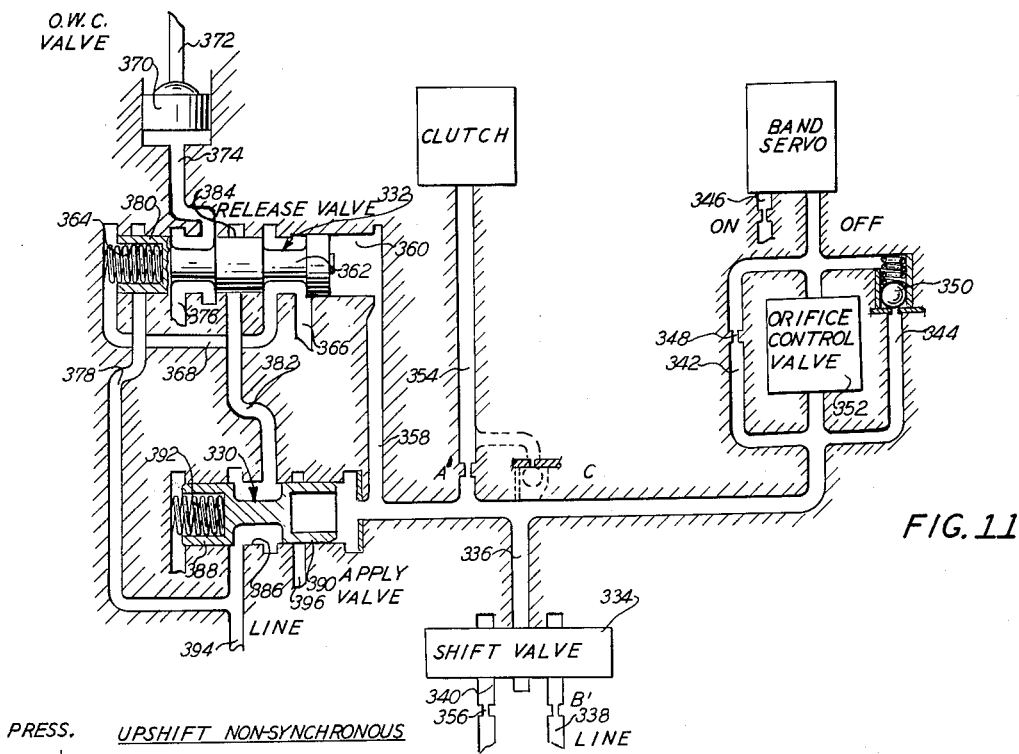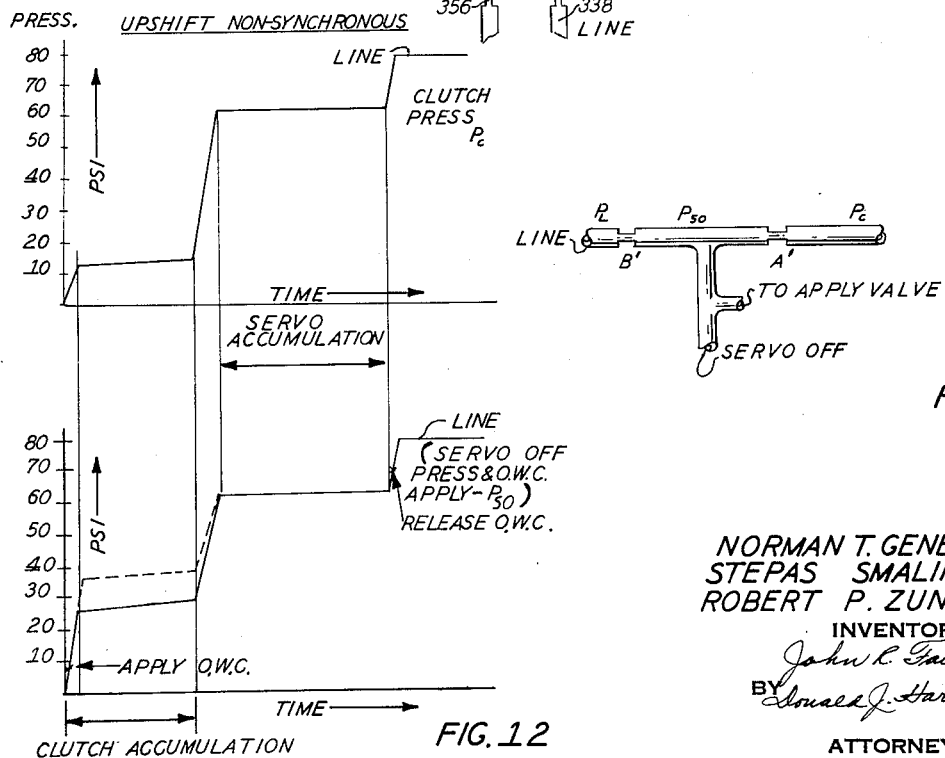

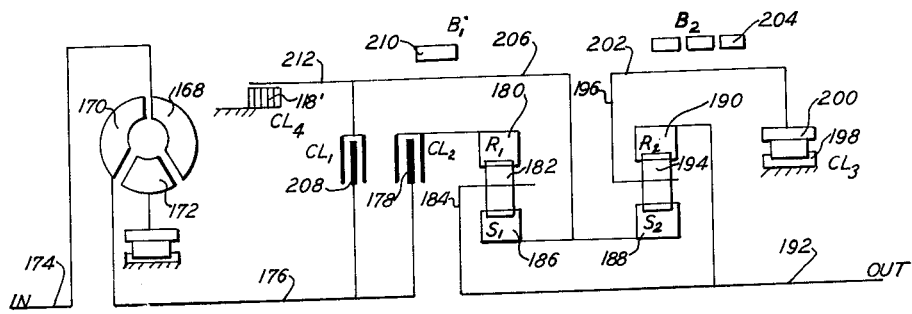
FIG. 14
| | $B_1$ | $B_2$ | $CL_1$ | $CL_2$ | $CL_3$ | $CL_4$ | RATIO |
|---|---|---|---|---|---|---|---|
| LOW (HB) | | X | | X | X | | $\frac{S_1}{R_1}\left(\frac{R_2}{S_2}+1\right)+1$ |
| LOW (DR) | | | | X | X | | |
| INT | X | | | X | | X | $1+S_1/R_1$ |
| DIRECT | | | | X | X | | 1.00 |
| REVERSE | | X | X | | | | $-R_2/S_2$ |
FIG. 15
SHIFT SEQUENCE
2-3 UPSHIFT 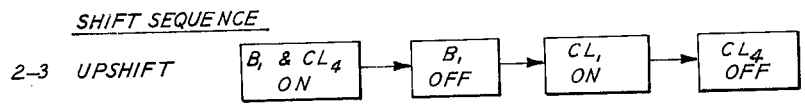
FIG. 16
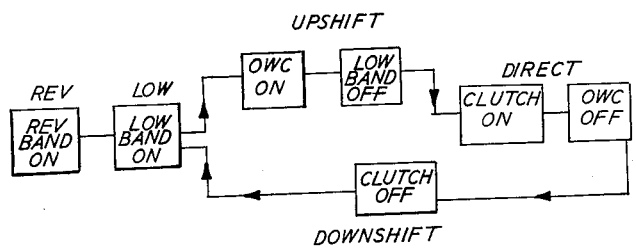
FIG. 17
NORMAN T. GENERAL
STEPAS SMALINSKAS
ROBERT P. ZUNDEL
INVENTORS
BY John R. Faulkner
Donald J. Harrington
ATTORNEYS … # 3,233,478
MULTIPLE SPEED POWER TRANSMISSION MECHANISM WITH NON-SYNCHRONOUS RATIO SHIFT CONTROLLERS Norman T. General, Orchard Lake, Stepas Smalinskas, Detroit, and Robert P. Zundel, Wayne, Mich., assignors to Ford Motor Company, Dearborn, Mich., a corporation of Delaware
Filed Jan. 18, 1963, Ser. No. 252,333
18 Claims. (Cl. 74—761)

Our invention relates generally to improvements in power transmission mechanisms, and more particularly to a multiple speed ratio power transmission mechanism having friction torque establishing devices in the form of clutches and brakes for conditioning the transmission mechanism for operation with various speed ratios.

According to a principal feature of our invention, provision is made for controlling the operation of the clutches and brakes to provide speed ratio shifts without the need for establishing synchronism between the application or release of one friction torque establishing device with respect to the application or release of another. It thus is possible to establish a maximum degree of shift quality or smoothness during a ratio shift interval without the need for providing complex shift timing control valve elements.

An automatic control valve system may be used for initiating speed ratio changes automatically in response to control signals such as engine torque demand and vehicle speed. But our improved circuit, which forms a part of the valve system, includes a minimum number of control variables that must be utilized to establish the desired shift quality. We contemplate also that changing operating conditions will not result in a change in the calibration of the control system that will adversely influence the shift quality.

In preferred embodiments of our invention, we have provided a releasable overrunning coupling that is capable of accommodating the torque reaction of the gear elements in the transmission mechanism during relatively low speed ratio operation. A subsequent shift to a higher speed ratio, such as direct drive, can be accomplished by engaging a fluid pressure operated friction clutch that connects together drivably two gear elements of the mechanism, thus conditioning the mechanism for operation in a so-called high speed ratio of unity. Provision is made also for controlling the operation of the one-way coupling with respect to the application and release of the clutch. The operation of the one-way coupling is supplemented or augmented by the operation of a friction brake that is capable of accommodating torque reaction for the gear elements in either a forward direction or a backward direction.

Our improved control system is capable of applying the releasable one-way coupling at a time prior to the low speed ratio to high speed ratio upshift. The friction brake, on the other hand, is released prior to the upshift. Thus, an upshift may be completed merely by engaging the high speed friction clutch thereby establishing a so-called non-synchronous "pickup" low to high upshift. The shift timing can be calibrated merely by appropriately calibrating the clutch without reference to control variables affecting the operation of the brake.

In one embodiment of our invention, the overrunning brake is applied continuously during operation in the high speed ratio and is released after a downshift is completed. Such a downshift, of course, is accomplished merely by releasing a friction clutch. After a predetermined shift time interval, the overrunning coupling therefore again will be capable of accommodating reaction torque. The downshift quality, like the upshift quality, is determined by calibration of the clutch without reference to control variables affecting the operation of the brake. In an alternate embodiment of our invention, however, the overrunning coupling is released following an upshift. Under these circumstances, the band is applied as the clutch is released during a downshift. The overrunning coupling then is energized only after a downshift is completed.

We contemplate also that our improved control system will employ an orifice arrangement that includes calibrated orifices at strategic locations. These orifices are utilized to control the application and release of the friction brake with respect to the operation of the clutch.

Our improved valve systems have been applied to two arrangements of gear elements, one arrangement being capable of providing two forward driving speed ratios and a single reverse speed ratio and the other being capable of providing three forward driving speed ratios and a single reverse ratio. Each gear arrangement will be described in this disclosure.

The provision of an improved transmission control valve system of the type above set forth being a principal object of our invention, it is a further object of our invention to provide a control system for an automatic power transmission mechanism in which synchronism between gear element motion controlling devices is not required.

It is a further object of our invention to provide a non-synchronous control valve system of simplified construction and which is characterized by a minimum number of design variables that affect speed ratio shift quality.

It is a further object of our invention to provide an improved overrunning coupling mechanism that is capable of being controlled by a fluid pressure signal to establish engagement and release.

It is a further object of our invention to provide a gear arrangement capable of accommodating the improved overrunning coupling mechanism referred to in the foregoing paragraph, whereby driving torque reaction of the gear mechanism can be controlled by appropriating controlling distribution of a control pressure signal to an overrunning coupling operator.

For the purpose of describing more particularly preferred embodiments of our invention, reference will be made to the accompanying drawings, wherein:

FIGURE 2 is an enlarged view of a portion of FIGURE 1;

FIGURE 3 is a partial cross-sectional view taken along section line 3—3 of FIGURE 2;

FIGURE 4 is a partial cross-sectional view taken along section line 4—4 of FIGURE 3;

FIGURE 5 shows an alternate overrunning coupling mechanism situated in an environment similar to that of FIGURE 2;

FIGURE 6 is a partial cross-sectional view taken along section line 6—6 of FIGURE 5;

FIGURE 7 is a partial cross-sectional view taken along section line 7—7 of FIGURE 6;

FIGURE 8 is a schematic diagram of a control valve system capable of controlling the clutch and brakes of the transmission mechanisms of FIGURES 1 and 14;

FIGURE 9 is a graphic representation of the variation in circuit pressures during an upshift;

FIGURE 10 is a graphic representation of the circuit pressures during a downshift;

FIGURE 11 is a schematic circuit diagram of an alternate control system for the transmission mechanisms of FIGURES 1 and 14;

FIGURE 12 is a graphic representation of the circuit pressures during an upshift and downshift when the transmission mechanism embodies a circuit of the type shown in FIGURE 11;

FIGURE 13 is a schematic representation of the orifice arrangement in a control system of the type shown in FIGURE 11;

FIGURE 14 is a three-speed gear arrangement capable of accommodating the control systems of FIGURES 8 and 11;

FIGURE 15 is a chart showing the clutch and brake operating pattern employed during the various shift sequences for the transmission mechanism of FIGURE 14;

FIGURE 16 is a chart illustrating the pattern of clutch and brake engagement and release during a 2–3 upshift for the transmission mechanism of FIGURE 14 and the circuit of FIGURE 11; and, FIGURE 17 is a chart illustrating the pattern of clutch and brake engagement and release during an upshift and a downshift for the transmission mechanism of FIGURE 1 and the circuit of FIGURE 11.

Figure 1:
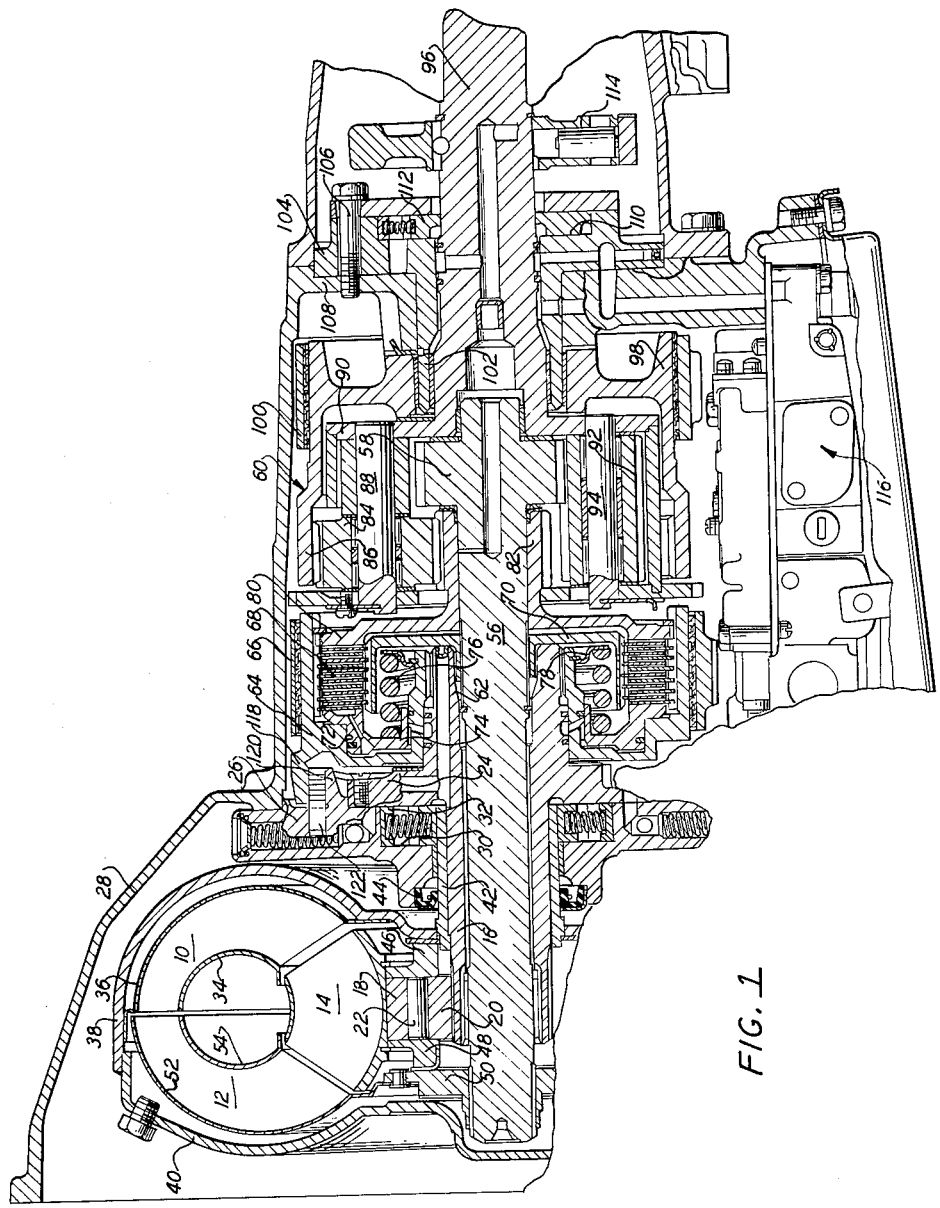
FIGURE 1 shows a hydrokinetic power transmission mechanism having a gear unit capable of establishing two forward-driving speed ratios and a single reverse ratio, and wherein the reaction member of the gear unit is controlled by an overrunning coupling that is responsive to a control pressure signal in its operation.

Referring first to FIGURE 1, a hydrokinetic impeller member is designated by reference character 10, and is situated in juxtaposed fluid flow relationship with respect to a turbine member 12 in a common torus circuit. Disposed between the flow exit section of the turbine 12 and the flow entrance section of impeller 10 is a bladed stator 14 which is mounted upon a stationary stator sleeve shaft 16.

The hub of stator 14 receives an outer race 18 and an inner race 20, the latter being splined to stationary sleeve shaft 16. Coupling rollers 22 are situated between races 18 and 20 and cooperate with cammed surfaces formed on the former.

Stationary sleeve shaft 16 forms an extension of an adaptor 24 that is bolted or otherwise secured to a separator wall 26 that in turn is connected to a unitary transmission casing 28. Separator wall 26 defines a pump chamber 30 within which pump elements 32 are disposed. These elements 32 define a positive displacement pressure source that forms a part of a control circuit subsequently to be described.

Impeller 10 comprises an inner shroud 34 and an outer shroud 36, the latter being carried by an impeller shell 38. A drive plate 40 is welded at its periphery to the periphery of shell 38 and may be connected drivably to a power input shaft in the form of an engine crankshaft for an internal combustion engine.

The hub of shell 38 is connected drivably to a sleeve shaft 42 that may be keyed in driving relationship with respect to pump elements 32. A fluid seal 44 is provided as indicated.

A pair of thrust members 46 and 48 is situated on either side of the races 18 and 20. Thrust member 48 engages a hub 50 for turbine 12, the outer shroud 52 for turbine 12 being riveted or otherwise secured to the hub 50 as indicated. The bladed passages of the turbine member 12 are defined in part also by an inner shroud 54.

A turbine shaft 56 is splined to hub 50 and extends in the direction of the geometric axis of FIGURE 1. The right hand end of shaft 56, as viewed in FIGURE 1, is connected to a first sun gear 58 for a compound planetary gear unit generally identified by reference character 60.

Adaptor 24 includes also a sleeve shaft extension 62 upon which is journalled for rotation a brake drum 64. The periphery of drum 64 defines a friction surface about which is disposed a friction brake band 66 that may be applied and released by means of a fluid pressure operated servo subsequently to be described.

The inner periphery of drum 64 is internally splined to permit driving engagement with externally splined clutch discs of a multiple disc clutch assembly 68. Internally splined discs of the assembly 68 are disposed in interdigital relationship with respect to the externally splined discs and are carried by an externally splined clutch member 70 which is splined or otherwise positively connected to shaft 56.

Drum 54 defines also an annular cylinder 72 within which is disposed an annular piston 74. This piston 74 and the cylinder 72 cooperate to define a fluid pressure chamber that may be pressurized selectively to engage multiple disc clutch assembly 68 thus establishing a driving connection between drum 64 and clutch member 70.

A clutch piston return spring 76 is disposed between piston 74 and a spring seat member 78.

A fluid pressure force back-up member for the piston 74 is shown at 80. It is splined to the internally splined drum 64 and is held fast against axial displacement by a snap-ring as indicated. A relatively small pitch diameter sun gear 82 is connected to the member 80 and is situated adjacent the sun gear 58. A first set of planet pinions 84 drivably engage sun gear 82 and a ring gear 86. Pinions 84 are journalled upon pinion shafts 88 which in turn are carried by a planetary gear carrier 90.

A second set of pinions 92 engage drivably sun gear 58 and also pinions 84, one pinion of the set 92 engaging a corresponding pinion of the set 84. The pinions 92 are journalled upon pinion shafts 94 which in turn are carried by the carrier 90. Carrier 90 is connected to a power output or driven member 96.

An extension of ring gear 86 defines a brake drum 98 about which a friction brake band 100 is disposed. Like the brake band 66, brake band 100 can be applied and released by a suitable fluid pressure operated servo. Brake drum 98 and the ring gear 86 are journalled for rotation upon a stationary extension 102 formed on an end wall adaptor 104 that is bolted by bolts 106 to an end wall 108 of the transmission housing 28. The power output shaft 96 is journalled within a stationary sleeve 102, a suitable bushing being provided as indicated for this purpose.

Adaptor 104 defines a rear pump cavity 110 within which positive displacement pump elements 112 are disposed. These elements 112 are connected drivably to power output shaft 96, and the pressure source defined thereby forms a part of a control valve system subsequently to be described.

A governor valve 114 is keyed or splined to power output shaft 96 and also forms a part of an automatic control valve circuit subsequently to be described. Governor valve 114 is capable of providing a fluid pressure signal that is proportional in magnitude to the speed of rotation of the power output shaft 96. For a particular description of such a governor valve mechanism, reference may be made to U.S. Patent No. 3,022,631, which is assigned to the assignee of our instant invention. The control valve circuit can be located in a valve body generally designated in FIGURE 1 by reference character 116. The valve body is situated in the transmission sump.

To establish low speed ratio operation, drum 64 is anchored and multiple disc clutch assembly 68 is released. Likewise, brake band 100 is released. Under these conditions, the turbine torque developed by the hydrokinetic torque converter unit is distributed from turbine member 12 to turbine shaft 56 and to sun gear 58. Sun gear 82 functions as a reaction member since it is anchored by the drum 64. It will be apparent, therefore, that the ring gear 86 will float freely and that the carrier 90 will be driven at a reduced speed ratio relative to the speed of sun gear 58. Power output shaft 96, of course, is driven at carrier speed.

To establish a direct drive high speed ratio, drum 64 is released and the multiple disc clutch assembly 68 is applied. This locks together sun gears 82 and 58, causing the gear unit 68 to rotate in unison at a 1 to 1 speed ratio. Thus turbine torque is delivered directly to the power output shaft 96.

To establish reverse drive operation, the drum 64 is released and the multiple disc clutch assembly 68 is released. The brake band 100 is applied to anchor ring gear 86 under these conditions. Since ring gear 86 acts as a reaction member and sun gear 82 is allowed to freewheel, the carrier 90 will be driven in a reverse direction at a reduced speed ratio relative to the driving speed of sun gear 58.

Drum 64 includes an extension 118 that overlies a cooperating extension or inner race 120. Extension 118 forms an outer race for a one-way coupling mechanism and the cooperating extension 120 forms an inner race. Disposed between the races is a series of spring windings for a one-way clutch spring 122. The spring windings are mounted upon the cylindrical surface of inner race 120 with a snug fit. One end of the clutch spring is anchored to the inner race 120. The other end of the clutch spring, as best seen in FIGURES 3 and 4, extends within a recess formed in separator wall 26 as indicated at 124. The outer periphery of clutch spring 122 is formed with a clearance so that the outer race 118 normally can rotate freely without frictional contact with the clutch spring 122.

A one-way brake plunger or shuttle valve 126 is slidably received within a cylinder 128, the latter being formed in a tangential position with respect to the center line of drum 64.

Valve 126 cooperates with cylinder 128 to define a pressure cavity 130. Fluid pressure can be distributed to cavity 120 through a pressure distributor passage 132 formed in wall 26.

In FIGURE 3, the anchor for one end of the coupling spring 122 is indicated by reference character 134. This may comprise a key carried by race 120. As fluid pressure is admitted to cavity 130, valve 126 is shifted in a left-hand direction as seen in FIGURE 3, thus causing coupling spring 122 to expand until it grips the inner cylindrical surface of race 118. Race 118 then will be inhibited from rotation in one direction, although rotation in the opposite direction will not be inhibited. On the other hand, if the pressure in cavity 130 is exhausted, valve 126 will be shifted under the residual spring pressure of spring 122 until race 118 is released.

Brake band 66, of course, supplements the braking action of the clutch spring and inhibits relative rotation in both directions.

Another form of overrunning coupling that may be employed for anchoring drum 64 is shown in FIGURES 5, 6 and 7. This includes a coupling race 136 that is splined or otherwise connected to an extension 138 of the brake drum which is identified in FIGURE 5 by reference character 64'. Other elements of the structure of FIGURE 5 that have corresponding elements in FIGURE 1 have been identified by similar reference numerals, although primed notations have been applied.

An inner race for the overrunning coupling shown in FIGURE 5 is identified by numeral 140. It may be carried by a shoulder formed on adaptor 24'. Disposed between the races 136 and 140 is a series of rollers 142. Race 140 can be formed with a plurality of cammed surfaces 144, one cammed surface cooperating with each roller 142.

A roller cage 146 can be apertured as shown at 148 in FIGURE 6 so that one roller 142 is received within each aperture. The apertures 148 are slightly oversize to permit a limited degree of shifting movement of the rollers 142.

Cage 146 includes an extension 150 that is received within a cooperating opening fromed in wall 26'. This opening is identified in FIGURE 6 by reference character 152. Connected to extension 150 are branch portions 154 and 156 that engage respectively a roller coupling spring 158 and a valve plunger or shuttle valve 160, respectively. Spring 158 can be received within a tangentially disposed cylindrical opening in the wall 26', and the valve 160 similarly can be received within a tangential cylindrical opening 162. Fluid pressure can be admitted to the pressure cavity behind valve 160 by means of a pressure distributor passage 164. This fluid pressure cavity is identified in FIGURE 6 by reference character 166.

The roller coupling shown in FIGURE 7 is applied when rollers 142 are shifted in a clockwise direction. This is accomplished by pressurizing the valve 160. When the pressure is exhausted, however, spring 158 releases the roller coupling to permit a free-wheeling motion of the drum 64 in either direction.

Referring next to FIGURES 14, 15 and 16, we have illustrated another transmission mechanism having a gear arrangement capable of accommodating overrunning couplings of the types illustrated in FIGURES 1 through 7. This transmission mechanism includes a hydrokinetic torque converter having a bladed impeller 168, a bladed turbine 170 and a bladed stator 172. The impeller, the turbine and the stator are situated in toroidal fluid flow relationship in the usual fashion. The impeller 168 is drivably connected to a power input shaft 174 which may be in the form of an engine driven crankshaft for an internal combustion engine.

Turbine 170 is connected to a turbine shaft 176, which in turn can be connected selectively by means of selectively engageable friction clutch 178 to a first ring gear 180.

Ring gear 180 meshes with a plurality of pinions 182 carried by a carrier 184. Pinions 182 engage also a first sun gear 186 which is connected to a second sun gear 188 for rotation in unison therewith. A second ring gear 190 is connected to a power output shaft indicated generally by reference character 192. This power output shaft is connected also to carrier 184. Sun gear 188 and ring gear 190 mesh with planet pinions 194 carried by carrier 196. This carrier can be anchored by an overrunning brake 198 which comprises an outer race 200 and a cooperating cammed inner race. A plurality of rollers is situated between the races, one roller engaging each cam surface. This inhibits rotation of the carrier 196 in one direction but permits free-wheeling motion in the opposite direction.

A friction brake, preferably of the multiple wrap band type, surrounds a brake drum 202 that is connected to carrier 196. This multiple wrap brake is identified by reference character 204. It may be applied to inhibit rotation of drum 202 in either direction, although it is self-energizing in a direction which is opposite to the first direction of braking for the roller brake shown in part at 198. The braking capacity in this opposite direction therefore is greater than the braking capacity in the first direction.

Turbine shaft 176 can be connected to the common sun gears 186 and 188 through a drive shell or torque transfer member 206. A selectively engageable clutch 208 can be provided for connecting selectively the member 206 with shaft 176. This member 206 also may be formed with or may be connected to a brake drum about which a brake band 210 is situated. This drum also is formed with an extension 212 that may form an outer race for a spring coupling of the type illustrated in FIGURES 1 through 4. We contemplate, however, that a roller coupling of the type illustrated in FIGURES 5, 6 and 7 also may be used. As in the former embodiment, a clearance is provided between the periphery of the spring coupling element and the inner periphery of the extension 212. The spring coupling in FIGURE 14 has been identified by reference character 118'. It surrounds an inner race connected to a relatively stationary member of the transmission mechanism with a snug fit. It may be actuated, however, by a fluid pressure operated valve in a manner similar to the valve and spring arrangement of FIGURES 1 through 4.

By referring to FIGURE 15, the pattern for the engagement and release of the various clutches and brakes can be understood more readily. For convenience, the letter symbols B1 and B2 have been applied to identify the brakes and the letter symbols CL1, CL2, CL3 and CL4 have been applied to identify the couplings. Also the magnitude of the torque ratio established in each drive range is indicated. For this purpose the sun and ring gears have been identified respectively by the letter symbols S1 or S2, and R1 or R2.

To obtain low speed ratio hill braking operation, brake B2 is applied and couplings CL2 and CL3 are applied. Brake B1 and couplings CL1 and CL4 are released. Under these conditions, turbine torque is delivered to ring gear R1, thus tending to drive sun gear S1 backwardly. This, of course, causes forward rotation of ring gear R2 with an increased torque ratio. The torque thus delivered to ring gear R2 is transmitted in turn to the power output shaft 192. This supplements the carrier torque of the carrier 184. Thus a split torque power delivery path is provided between the turbine and the power output shaft 192.

Clutch or coupling CL2 is applied also in the normal low driving range. Brake B2, however, is released since the carrier torque is accommodated by the overrunning coupling CL3. Braking torque reaction in the opposite direction is inhibited, of course, since B2 is released.

Intermediate speed ratio operation is accomplished by applying brake B1 and coupling CL4. This anchors the sun gears. Thus the turbine torque is multiplied only by the first gear unit and the coupling CL3 is caused to freewheel. The carrier 184 functions as a power output member which drives the power output shaft 192.

Direct drive operation is accomplished by applying clutch CL1 while clutch CL2 remains applied. This locks up the planetary gear unit. Turbine torque then is delivered directly to power output shaft.

Reverse drive is accomplished by engaging clutch CL1 and brake B2. Turbine torque then is delivered to sun gear S2. Since the carrier 196 is anchored by brake B2, ring gear R2 and power output shaft 192 are driven in a reverse direction at a reduced speed ratio.

The operation of the coupling CL4 in the embodiment of FIGURE 14 will be described in subsequent paragraphs. In one arrangement it is released following an upshift and in another arrangement it is applied continuously following an upshift. On a downshift, coupling CL4 is applied after a synchronized clutch to band downshift. But in another arrangement, the brake band B1 is not applied until after the downshift is accomplished.

FIGURE 16 shows a shift sequence on a 2–3 upshift when a circuit of the type shown in FIGURE 11 is employed. The shift sequence of FIGURE 16 does not apply, however, if the circuit of FIGURE 8 is employed. FIGURE 17 shows a corresponding shift pattern for the transmission of FIGURE 1 when it incorporates a circuit of the type shown in FIGURE 11. Both the upshift and downshift patterns are demonstrated in FIGURE 17.

Referring next to FIGURE 8, we have illustrated schematically a control valve circuit capable of controlling the application and release of the various clutches and brakes for the transmission mechanisms of FIGURES 1 and 14. If it is applied to the mechanism of FIGURE 14, the circuit illustrated in FIGURE 8 controls a 2–3 upshift and a 3–2 downshift. On the other hand, if the circuit is applied to the mechanism of FIGURE 1, it controls a 1–2 upshift and a 2–1 downshift.

For purposes of this description, it will be assumed that the circuit of FIGURE 8 is applied to a mechanism of the type shown in FIGURE 1. The brake band servo for the brake band 66 includes a piston 216 situated within the servo cylinder 218. Piston 216 cooperates with cylinder 218 to define a pair of pressure chambers 220 and 222. Chamber 220 is on the apply side of the servo and chamber 222 is on the release side thereof. A piston return spring is shown at 224 for normally biasing the piston 216 to a brake servo release position.

The clutch servo includes the previously described piston 74 that is situated within chamber 72. Piston 74 and chamber 72 cooperate to define a pressure cavity 226.

Fluid pressure is admitted to the cavity by a pressure distributor passage 228 in which is formed a restriction in the form of orifice A.

Control pressure is supplied to cavity 220 through a pressure distributor passage 230 having a similar restriction orifice 232 which retards the rate of pressure distribution to the brake band servo.

Control pressure in passage 230 is supplied by a passage 234 which in turn communicates with a pressure regulator valve 236. This valve regulates the pressure output of the positive displacement pump defined in part by elements 32. It also regulates the pressure output of the pump defined in part by the elements 112. Check valves 238 and 240 are provided for connecting either one or the other of the pumps to the inlet side of the regulator valve 236. The inlet side of each pump is connected to a sump as indicated at 229.

Passage 234 is connected to a passage 240 extending to a shift valve 242. The outlet side of the valve 242 is connected through a passage 244 to a passage 246 that communicates with passage 228 and with the chamber 222 on the release side of the brake band servo. An orifice B is located in the portion of this passage 246 that extends to the chamber 222.

When pressure is distributed to chamber 222 it may follow a by-pass passage 248 having a one-way check valve 250 for establishing free flow toward the brake band servo while inhibiting reverse flow through passage 248 from the brake band servo.

An engine torque demand sensitive valve, commonly referred to as a throttle valve, is shown at 252. It may be actuated, as shown, by a vehicle accelerator pedal 254 or by an engine intake manifold pressure operated servo, not shown. Valve 252 is supplied with control pressure through a branch passage 256. The output pressure signal of the throttle valve 252 is distributed through passage 258 to one side of the shift valve 242. It is distributed also to a compensator valve 260. The compensator valve 260 also is subjected to governor pressure through a passage 264. The governor pressure in turn is an indicator of vehicle speed and is supplied by the previously described governor valve 114. The output pressure passage of governor valve 114 is shown at 268 and is connected to passage 264 as well as to the opposite side of shift valve 242.

The compensator valve 260 modulates the regulated pressure in a control pressure passage 270 to produce a compensator pressure in passage 272 that is fed back to the regulator valve 236. Thus the regulator valve is made sensitive to both throttle valve pressure and governor valve pressure, and the magnitude of the control pressure level maintained by the regulator valve therefore is influenced by both torque demand and vehicle speed.

A flow restricting exhaust port for the shift valve is shown at 274. The shift valve is responsive to opposed pressure forces established by the throttle pressure and the governor valve pressure. At high vehicle speeds for any given engine throttle setting, the shift valve will establish communication between passage 240 and passage 244. At low vehicle speeds for any given throttle setting, however, passage 244 is connected to exhaust port 274 by the shift valve.

It thus will be apparent that the shift valve will control the application and release of the direct drive clutch and the brake band servo. If the shift valve functions to connect passage 244 and passage 240, the clutch will become applied and the brake band servo will become disengaged. Since the piston 216 for the brake band servo is double acting, it becomes disengaged whenever pressure chambers 220 and 22 are pressurized with a common pressure.

Passage 246 communicates with a passage 276 which extends to an accumulator 278. The connection between passages 246 and 276 is formed by a flow restricting orifice 280. A one-way by-pass passage 282 is provided for short circuiting the orifice 280. For convenience, this orifice 280 will hereinafter be referred to as orifice C.

A one-way check valve 284 is disposed in the by-pass passage 282 to permit fluid flow from passage 246 to passage 276 while inhibiting flow through the by-pass passage in the opposite direction.

The accumulator 278 comprises an accumulator cylinder 286 within which a piston 288 is received. An upper portion 290 of the piston is received slidably within the reduced diameter cylinder 292.

The region of the cylinder portion 292 above the piston is pressurized with regulated line pressure which is distributed thereto through a passage 294. This same passage 294 communicates also with passage 230 described previously.

A relatively large diameter cylinder portion, shown at 286, communicates with an exhaust port 296.

Passage 276 communicates with one end of an apply valve cylinder 298 within which is slidably positioned a one-way coupling apply valve 300 having spaced lands 302 and 304. This valve 300 is urged in a right-hand direction as viewed in FIG. 8 by a valve spring 306.

An exhaust port communicates with the cylinder 298 as shown at 308. A passage 310 also communicates with cylinder 298, and it is subjected normally to control pressure since it communicates directly with passage 234. The left-hand end of cylinder 298 communicates with exhaust port 312 as indicated.

Valve 300 can shift within its cooperating cylinder 298 under the influence of pressure existing in the right-hand end thereof. If it assumes a left-hand position, communication is established between passage 310 and a passage 314 communicating with a one-way coupling valve 316. This valve corresponds to the shuttle valve 166 of the embodiments of FIGS. 5, 6 and 7 and corresponds also to the shuttle valve 126 of the embodiment of FIGS. 1 through 4. If passage 314 is pressurized, valve 316 is shifted within a cooperating cylinder 318 to cause engagement of its associated one-way coupling.

During an up-shift from a low speed ratio to a high speed ratio, the shift valve 242 is shifted to establish communication between passages 240 and 244. As soon as the pressure in passage 246, which is referred to as area "A," increases to a low value of approximately 8 p.s.i., the apply valve 300 is shifted in a left-hand direction. This establishes communication between passage 310 and passage 314 which causes the valve 316 to be shifted under pressure. This occurs prior to the time that the clutch servo begins to accumulate. This application of the overrunning coupling is assured prior to a 1–2 upshift.

Upon a further increase in the pressure at area "A" following movement of the shift valve to the upshift position, the accumulator piston 288 will begin to stroke at approximately 15 p.s.i., assuming that the line pressure in passage 294 is approximately 75 p.s.i. After the accumulator piston reaches its fully stroked position, the pressure will increase to a value that is sufficient to cause the clutch servo to begin accumulation. In one operating embodiment, the clutch spring 76 is sufficient to oppose any fluid pressure force that is less than 20 p.s.i. The clutch servo then will begin to accumulate at that valve. Following accumulation of the accumulator piston 288 and during the time when clutch servo accumulation takes place, further significant pressure build-up in area "A" does not take place.

Orifice A in passage 228 will cause a pressure drop during clutch servo accumulation. Therefore the pressure in area "A" and on the release side of the brake band servo will be higher than the pressure in the clutch chamber 226. The pressure in the brake band servo that exists during servo accumulation is only slightly less than that pressure which would be required to release the band servo.

After clutch accumulation ceases, the pressure in area "A" again will begin to build up. At this point the brake band servo becomes released as the clutch servo gains capacity. After this occurs, the brake band servo begins to accumulate. At this time, however, the clutch is energized with a reduced pressure that stays at a relatively unchanging value. When band servo accumulation is complete, the pressure in area "A" again is caused to increase to a maximum value, which may be approximately 75 p.s.i. When this occurs, of course, the clutch reaches its full torque transmitting capacity, and the upshift is completed. As the clutch becomes applied, the reaction gear element of the transmission, which in the case of FIG. 1 would be the front sun gear 92, is relieved of reaction torque and the over-running coupling is caused to overrun. Thus the 1–2 upshift can be described as a non-synchronous upshift.

FIG. 9 shows a plot of the pressures that exist in the clutch servo, the brake servo and in area "A" during the shift interval. During each accumulation period, the variation in pressure that is plotted in FIG. 9 is almost constant.

On a downshift the shift valve 242 is urged to a downshift position under the influence of governor pressure and throttle pressure. Communication between passages 244 and exhaust port 274 then is established. A flow restricting orifice is located in exhaust port 274 as indicated to control the rate of exhaust of area "A."

Under these conditions, check valve 284 will close. Thus any transfer of pressurized fluid from passage 276 to area "A" must take place through restriction C.

The accumulator piston 288 will begin to stroke downwardly under these conditions under the influence of the 75 p.s.i. line pressure acting on the upper end thereof. Thus, for a predetermined time interval following movement of the shift valve 242 to a downshift position, the restriction C will maintain a pressure in passage 276 that is sufficient to maintain the apply valve 300 in a left hand position against the opposing force of spring 306. Therefore, communication is maintained between passage 310 and passage 314 thus assuring that the overrunning coupling will remain actuated.

The pressure in the clutch servo will become reduced during the interval that the accumulator piston 288 is stroking. The orifice A and the orifice C can be calibrated so that clutch accumulation is complete at a time prior to the completion of the accumulation of piston 288. Thus, the clutch will become disengaged while the overrunning coupling still is applied.

During this shift interval ball check valve 250 assumes a closed position. Therefore, the pressurized fluid on the release side of the brake band servo is transferred through restriction B. The degree of restriction at B relative to the restriction at A can be calibrated so that the clutch will be fully disengaged at a time prior to the completion of the brake servo accumulation. Thus, the band will become applied after the downshift is completed.

In FIG. 10 we have illustrated variations in pressures in the two servos and in area "A" during the downshift time interval. During such a downshift, shift feel quality can be obtained by calibrating appropriately the orifice in the passage 274 and the restriction A. The characteristics of the brake servo do not enter into this calibration since the downshift is complete at a time prior to the application of the brake band. Thus the calibration of the system as a whole is substantially simplified since the number of variables that affect the downshift feel quality are reduced in number.

During a neutral to low shift as the vehicle operator conditions the transmission for acceleration from a standing start, the brake band servo becomes applied. The use of the friction brake as a reaction element, rather than the overrunning coupling, establishes the smoothest operating condition for such a shift. The driving reaction torque then is accommodated by the friction brake rather than by the overrunning coupling. The brake band servo also is available to provide two-way braking action under coasting conditions.

During an upshift, it will be noted that the pressure in area "A" is substantially the same as the pressure on the off side of the servo. This is due to the fact that there is no flow in the servo passage 246 following movement of the shift valve to an upshift position. Once the brake band servo begins to accumulate during an upshift, however, flow does occur in passage 246. But this takes place with a minimum pressure drop since restriction B is by-passed by the passage 248 and the one-way check valve 250.

With the alternate control system of FIGS. 11, 12 and 13, it is possible to apply the overrunning coupling before a band to clutch upshift. Following application of the overrunning coupling, the band can be released at a time prior to engagement of the clutch. Thus the resulting upshift is a so-called non-synchronous upshift from an overrunning coupling. Following completion of the upshift, the overrunning coupling is released. On a downshift, the overrunning coupling is inactive and the downshift is accomplished by a synchronized clutch to band shift.

This shift sequence is obtained by providing an apply valve 330 and a release valve 332 in the overrunning coupling circuit. A shift valve corresponding to shift valve 242 of the circuit of FIG. 8 is shown at 334. It is capable of establishing communication between passage 336 and the passage 338, the latter being supplied with control pressure in a manner similar to that which is described with reference to the circuit of FIG. 8. Other portions of the control circuit of FIG. 8, such as the throttle valve, the compensator, the regulator and the governor, can be applied to the circuit of FIG. 11 in a corresponding fashion. These components therefore will not be described again.

The exhaust passage for the shift valve is indicated at 340. This corresponds to exhaust passage 274 of the circuit of FIG. 8.

Passage 336 extends to branch passages 342 and 344 that communicate with the release side of the brake band servo. The apply side of the brake band servo is pressurized by a line pressure passage 346. This passage corresponds to passage 230 in the circuit of FIG. 8 and is pressurized in a similar fashion.

A restriction 348 is located in passage 342 and a one-way check valve 350 is located in passage 344 to provide relatively uninhibited fluid transfer from passage 336 to the release side of the brake servo while inhibiting flow in the opposite direction.

If desired, an orifice control valve 352 can be provided in addition to restriction 348 for varying the effective degree of restriction of the fluid that is exhausted from the release side of the brake band servo on a downshift. This orifice control valve can be influenced by operating parameters such as vehicle speed and engine torque demand.

The clutch servo communicates with passage 336 through a passage 354. A restriction A' is located in passage 354. Similarly a restriction B' is located in the line pressure passage 338 and a restriction 356 is located in exhaust passage 340.

Passage 336 communicates directly with a passage 358 extending to one end of a release valve chamber 360 within which is positioned slidably a release valve spool 362. This valve spool is urged in a right-hand direction as viewed in FIG. 11 by a valve spring 364. It is urged in the opposite direction, however, by the pressure in passage 358.

An exhaust port in the valve chamber 360 is shown at 366. A cross-over passage communicates with spaced portions of the valve cylinder 360 as indicated at 368.

The overrunning coupling valve that applies the overrunning coupling is indicated at 370. This corresponds in function to the valve 316 indicated in FIG. 8. A portion of the overrunning coupling spring is indicated in FIG. 11 at 372. When valve 370 is pressurized, spring 372 becomes applied.

Valve 370 is positioned movably within a valve chamber that is pressurized by passage 374.

An exhaust port 376 communicates with chamber 360. Further, a line pressure passage 378 communicates with the chamber 360 at a point which is close to the left hand end thereof and close to the cross-over passage 368.

When the valve 332 assumes the position shown in FIG. 11, communication is established between passage 374 and exhaust passage 376. Under these conditions, the valve 370 moves downwardly, as viewed in FIG. 11, causing the overrunning coupling to become released. If the valve 332 is shifted in a right hand direction under the influence of spring pressure, port 376 is blocked by valve land 380 and passage 378 becomes uncovered by land 380. Furthermore, a line pressure passage 382 communicating with the chamber 360 becomes uncovered by valve land 384 as the valve element 332 is shifted in a right hand direction. Valve land 384 also covers the right hand end of cross-over passage 368 thus interrupting communication between exhaust port 366 and passage 368.

The apply valve chamber 386 slidably receives the apply valve 330. This apply valve is formed with spaced valve lands 388 and 390. Valve 330 is biased in a right hand direction by a valve spring 392 and it is urged in a left hand direction as viewed in FIG. 11 by pressure that is supplied to the right hand side of chamber 386 by passage 358.

Passage 382 and passage 378 communicate with a common control pressure supply passage as shown at 394. This passage corresponds to passage 310 in the embodiment of FIG. 8. An exhaust port in chamber 386 is shown at 396.

When the apply valve assumes the position shown in FIG. 11, communication is established between the line pressure passage 394 and passage 382. If the valve 330 is shifted in a right hand direction upon a reduction of pressure in passage 358, land 388 blocks passage 394 and establishes communication between passage 382 and exhaust port 396.

During an upshift, the shift valve establishes communication between passage 338 and passage 336. Immediately following movement of the shift valve to an upshift position, pressure in passage 336 will begin to develop. When a pressure of approximately 8 p.s.i. is reached, the apply valve is shifted against the opposing force of spring 392 thus establishing communication between line pressure supply passage 394 and passage 382. This pressure of 8 p.s.i. is substantially lower than the pressure at which the clutch servo and the brake servo begin to accumulate. In the case of the clutch, it will begin to accumulate at approximately 19 p.s.i. The brake band servo will begin to accumulate at approximately 45 p.s.i. Thus the overrunning coupling becomes pressurized immediately upon actuation of the apply valve since the release valve permits communication to take place in the passages 374 and 382. When the clutch becomes applied, the torque reaction therefore will be taken off from the overrunning coupling with a so-called non-synchronous upshift.

After the clutch servo and the brake servo have finished their respective accumulation periods, the pressure will then rise to its maximum value very quickly. This is indicated in FIG. 12. When the pressure rise is approximately 90 percent of the maximum line pressure available, the pressure in passage 358 then will be sufficient to shift the release valve against the opposing force of spring 364. This immediately exhausts the cross-over passage 368 through exhaust port 366. Land 380 also seals off passage 378. In addition, passage 382 is sealed by land 384 and passage 374 is open to the exhaust port 376. Thus the overrunning coupling will become released. Because of the redistribution of the pressure forces acting upon the release valve, the release valve will remain in a left hand position as viewed in FIG. 11 until the supply line pressure again falls to a value of approximately 8 p.s.i. or less. Thus the overrunning coupling will remain inactive during a subsequent downshift. Such downshifts then will occur by the synchronous action of the brake band servo and the clutch servo.

During an upshift, it is necessary to induce an early release of the brake band with respect to the application of the clutch. This can be done by appropriately controlling the sizes of orifices A′ and B′. Thus during an upshift the pressure made available to the release side of the brake band servo will be higher than the pressure in passage 354.

The orifice arrangement is illustrated diagrammatically in FIG. 13. The symbol $P_c$ indicates clutch pressure and the symbol $P_{so}$ indicates servo off pressure. Symbol $P_1$ indicates line pressure. By varying the size of orifice A′ relative to the size of orifice B′, the pressure made available to the overrunning coupling apply valve can be controlled. Also the value of the servo off pressure relative to the clutch pressure can be controlled by adjusting these variables.

Having thus described preferred embodiments of our invention, what we claim and desire to secure by U.S. Letters Patent is:

1. In a multiple speed power transmission mechanism having a gear unit with gear elements disposed within a transmission casing and adapted to form torque delivery paths between a driving member and a driven member, said driving member being connected drivably to a first element of said gear unit and said driven member being connected to a second element thereof, said gear unit including a reaction element, selectively engageable coupling means for providing a unidirectional torque reaction delivery path between said reaction element and said casing to establish low speed ratio operation, selectively engageable clutch means having a first fluid pressure operated clutch applying servo for connecting two elements of said mechanism together for rotation in unison thereby establishing relatively high speed ratio operation, means including a second fluid pressure operated servo for controlling engagement and release of said coupling means, a fluid pressure source, conduit structure interconnecting said pressure source and said servos including separate branch portions extending to each servo, separate fluid pressure distributor valve means disposed in and forming a part of each of said separate conduit structure portions for controlling distribution of pressure to said servos, a fluid flow restricting fluid passage interconnecting said first servo and the valve means in the conduit structure portion extending to said coupling means, and an accumulator having a movable accumulator member partly defining an accumulator chamber of variable volume, said accumulator chamber being in fluid communication with said flow restricting fluid passage.

2. In a multiple speed power transmission mechanism having a gear unit with gear elements adapted to form torque delivery paths between a driving member and a driven member, said gear elements being disposed in a stationary transmission casing, said driving member being connected drivably to a first element of said gear unit and said driven member being connected to a second element thereof, said gear unit including a reaction element, fluid pressure releasable coupling means for inhibiting rotation of said reaction element in one direction to provide a unidirectional torque reaction delivery path between said reaction element and said casing during low speed ratio operation, selectively engageable fluid pressure operable clutch means for connecting two elements of said mechanism together for rotation in unison thereby establishing relatively high speed ratio of operation, a fluid pressure source, conduit structure interconnecting said coupling means with said pressure source, valve means disposed in fluid communication with said conduit structure for selectively controlling distribution of pressure to said coupling means to engage the same during a speed ratio change from a low speed ratio to a higher speed ratio as said clutch means becomes applied and to release said coupling means to permit motion of said reaction element in said one direction during reverse drive operation, and means for providing fluid communication between said fluid pressure operable clutch means and said valve means whereby the latter responds to a change in the operating pressure in said clutch means.

3. In a multiple speed power transmission mechanism having a gear unit with gear elements disposed within a casing and adapted to form torque delivery paths between a driving member and a driven member, said driving member being connected drivably to a first element of said gear unit and said driven member being connected drivably to a second element thereof, said gear unit including a reaction element, releasable coupling means for providing a unidirectional torque reaction delivery path between said reaction element and said casing during operation of said mechanism in a relatively low speed ratio, fluid pressure operated clutch means for connecting together two elements of said mechanism for rotation in unison thereby establishing relatively high speed ratio operation, a fluid pressure source, conduit structure interconnecting said fluid pressure source and said clutch means, a shift valve means disposed in and partly defining said conduit structure for controlling distribution of fluid pressure to said clutch means, a pressure passage communicating with said pressure source and extending to said coupling means, apply valve means disposed in and partly defining said pressure passage for pressurizing and exhausting said coupling means, said apply valve means being disposed in fluid communication with said conduit structure, said coupling means responding to the pressure in said conduit structure at a time prior to engagement of said clutch means upon a low speed ratio to a high speed ratio shift sequence.

4. In a multiple speed power transmission mechanism having a gear unit with gear elements disposed within a casing and adapted to form torque delivery paths between a driving member and a driven member, said driving member being connected drivably to a first element of said gear unit and said driven member being connected drivably to a second element thereof, said gear unit including a reaction element, releasable coupling means for providing a unidirectional torque reaction delivery path between said reaction element and said casing during operation of said mechanism in a relatively low speed ratio, fluid pressure operated clutch means for connecting together two elements of said mechanism for rotation in unison thereby establishing relatively high speed ratio operation, a fluid pressure source, conduit structure interconnecting said fluid pressure source and said clutch means, shift valve means disposed in and partly defining said conduit structure for controlling distribution of fluid pressure to said clutch means, a pressure passage communicating with said pressure source and extending to said coupling means, apply valve means disposed in and partly defining said pressure passage for pressurizing and exhausting said coupling means, apply valve means being disposed in fluid communication with said conduit structure, said coupling means responding to the pressure in said conduit structure at a time prior to engagement of said clutch means upon a low speed ratio to a high speed ratio shift sequence, and a fluid pressure operated friction brake means for anchoring said reaction element to complement the braking action of said coupling means, said friction brake means including a fluid pressure responsive actuator servo having a fluid pressure operated portion movable to a brake means release position in response to a fluid pressure build-up therein, said servo being in fluid communication with said clutch means whereby said servo is urged to a brake means release position in sequence with the application of said clutch means.

5. In a multiple speed power transmission mechanism having a gear unit with gear elements disposed in a transmission casing and adapted to form torque delivery paths between a driving member and a driven member, said driving member being connected to a first element of said gear unit and said driven member being connected to a second element thereof, said gear unit including a reaction element, fluid pressure operated overrunning coupling means forming in part a one-way torque reaction delivery path between said reaction element and said casing during operation of said mechanism in a relatively low speed ratio, fluid pressure operated clutch means for connecting together two elements of said mechanism for rotation in unison thereby establishing relatively high speed ratio operation, a fluid pressure source, conduit structure including separate portions connecting respectively said source with said coupling means and said clutch means, separate distributor valve means disposed in each conduit structure portion, for establishing and interrupting distribution of pressure therethrough, a first of said distributor valve means controlling selectively the distribution of pressure from said source to said clutch means, a fluid pressure passage connecting a second distributor valve means and the conduit structure portion connected to said clutch means, said second distributor valve means responding to a clutch pressure build-up to control distribution of pressure from said source to said coupling means, whereby second distributor valve means is adapted to trigger application of said coupling means at a time prior to engagement of the clutch means following initiation of a low speed ratio to a high speed ratio shift sequence.

6. In a multiple speed power transmission mechanism having a gear unit with gear elements disposed in a transmission casing and adapted to form torque delivery paths between a driving member and a driven member, said driving member being connected to a first element of said gear unit and said driven member being connected to a second element thereof, said gear unit including a reaction element, fluid pressure operated overrunning coupling means forming in part a one-way torque reaction delivery path between said reaction element and said casing during operation of said mechansim in a relatively low speed ratio, fluid pressure operated clutch means for connecting together two elements of said mechanism for rotation in unison thereby establishing relatively high speed ratio operation, a fluid pressure source, conduit structure including separate portions connecting respectively said source with said coupling means and said clutch means, a separate distributor valve means disposed in each conduit structure portion for establishing and interrupting distribution of pressure therethrough, a first of said distributor valve means controlling selectively the distribution of pressure from said source to said clutch means, a fluid pressure passage connecting a second distributor valve means and the conduit structure portion connected to said clutch means, said second distributor valve means responding to a clutch pressure build-up to control distribution of pressure from said source to said coupling means, said second distributor valve means being adapted to trigger application of said coupling means at a time prior to engagement of the clutch means following initiation of a low speed ratio to a high speed ratio shift sequence, and a fluid pressure responsive friction brake means for anchoring said reaction element to complement the action of said coupling means, said friction brake means including a fluid pressure operated servo disposed in fluid communication with said clutch means and comprising a movable actuator that is urged to a friction brake release position upon a clutch pressure build-up.

7. In a multiple speed power transmission mechanism having a gear unit with gear elements disposed in a transmission casing and adapted to form torque delivery paths between a driving member and a driven member, said driving member being connected to a first element of said gear unit and said driven member being connected to a second element thereof, said gear unit including a reaction element, fluid pressure operated coupling means forming a one-way torque reaction delivery path between said reaction element and said casing during operation of said mechanism in a relatively low speed ratio, fluid pressure operated clutch means for connecting together two elements of said mechanism for rotation in unison thereby establishing relatively high speed ratio operation, a fluid pressure source, conduit structure including separate portions connecting respectively said source with said coupling means and said clutch means, first and second distributor valve means disposed in and partly defining said conduit structure portions for controlling respectively the distribution of pressure from said source to said clutch means and said coupling means, said second distributor valve means responding to a clutch pressure build-up to control distribution of pressure from said source to said coupling means, said second distributor valve means being adapted to trigger application of said coupling means at a time prior to engagement of the clutch means following initiation of a low speed ratio to a high speed ratio shift sequence, a fluid pressure accumulator having a movable accumulator member defining in part an accumulator chamber and a branch passage portion interconnecting said accumulator chamber and said first conduit structure portion whereby the pressure in the region of the said clutch means acts upon and triggers said second distributor valve means, said accumulator chamber being in communication with said fluid pressure passage.

8. In a multiple speed power transmission mechanism having a gear unit with gear elements disposed in a transmission casing and adapted to form torque delivery paths between a driving member and a driven member, said driving member being connected to a first element of said gear unit and said driven member being connected to a second element thereof, said gear unit including a reaction element, fluid pressure operated unidirectional coupling means forming in part a one-way torque reaction delivery path between said reaction element and said stationary casing during operation of said mechanism in a low speed ratio fluid pressure operated clutch means for connecting together two elements of said mechanism for rotation in unison thereby establishing relatively high speed ratio operation, a fluid pressure source, conduit structure including first and second portions connecting respectively said source with said coupling means and said clutch means, first and second distributor valve means disposed in and partly defining said first and second conduit structure portions for controlling respectively the distribution of pressure from said source to said clutch means and said coupling means, a pressure passage interconnecting said first conduit structure portion and said second distributor valve means, said second distributor valve means responding to a clutch pressure build-up to control distribution of pressure from said source to said coupling means, said second distributor valve means being adapted to trigger application of said coupling means at a time prior to engagement of the clutch means following initiation of a low speed ratio to a high speed ratio shift sequence, a fluid pressure responsive friction brake means for anchoring said reaction element to complement the action of said coupling means, said friction brake means including a fluid pressure operated servo disposed in fluid communication with said clutch means, said friction brake servo comprising a movable actuator that is urged to a friction brake release position upon a clutch pressure build-up in said clutch means, and a fluid pressure accumulator having a movable accumulator member defining in part an accumulator chamber, said accumulator chamber being in communication with said pressure passage.

9. In a multiple speed power transmission mechanism having a gear unit with gear elements disposed within a stationary casing and adapted to form torque delivery paths between a driving member and a driven member, said driving member being connected drivably to a first element of said gear unit and said driven member being connected drivably to a second element thereof, said gear unit including a reaction element, releasable coupling means for providing a unidirectional torque reaction delivery path between said reaction element and said casing during operation of said mechanism in a relatively low speed ratio, fluid pressure operated clutch means for connecting together two elements of said mechanism for rotation in unison thereby establishing relatively high speed ratio operation, a fluid pressure source, conduit structure having first and second portions interconnecting said source with fluid pressure operated clutch means and said coupling means respectively, first and second pressure distributor valve means disposed respectively in and partly defining said first and second conduit structure portions for controlling distribution of fluid pressure to said clutch means and said coupling means, a branch passage connecting said second distributor valve means and said first conduit structure portion said coupling means responding to the pressure in said first conduit structure portion at a time prior to engagement of said clutch means following initiation of a low speed ratio to a high speed ratio shift sequence, and a fluid pressure operated friction brake means for anchoring said reaction element to complement the action of said coupling means, said friction brake means including a double acting servo having a brake applying pressure chamber and brake release pressure chamber, said presssure chambers being defined in part by a movable brake apply member, said pressure release chamber being in fluid communication with said clutch means.

10. In a multiple speed power transmission mechanism having a gear unit with gear elements disposed within a stationary casing and adapted to form torque delivery paths between a driving member and a driven member, said driving member being connected drivably to a first element of said gear unit and said driven member being connected drivably to a second element thereof, said gear unit including a reaction element, releasible coupling means for providing a unidirectional torque reaction delivery path between said reaction element and said casing during operation of said mechanism in a low speed ratio, fluid pressure operated clutch means for connecting together two elements of said mechanism for rotation in unison thereby establishing relatively high speed ratio operation, a fluid pressure source, conduit structure having first and second portions connecting respectively said source with fluid pressure operated clutch means and said coupling means, first and second pressure distributor valve means disposed in and partly defining said first and second conduit structure portions for controlling distribution of fluid pressure to said clutch means and said coupling means, a branch passage connecting said second distributor valve means and said first conduit structure portion, said coupling means responding to the pressure in said first conduit structure portion at a time prior to engagement of said clutch means following initiation of a low speed ratio to a high speed ratio shift sequence, a fluid pressure operated friction brake means for anchoring said reaction element to complement the action of said first mentioned brake means, said friction brake means including a double acting servo having a brake apply pressure chamber and brake release pressure chamber, said pressure chambers being defined in part by a movable brake apply member, said pressure release chamber being in fluid communication with said clutch means, and a fluid flow restriction situated in said first conduit structure portion between said first distributor valve and said clutch means whereby the fluid flow path between said pressure source and said clutch means is restricted to a higher degree than the fluid flow path between said source and said brake release pressure chamber.

11. In a multiple speed power transmission mechanism having a gear unit with gear elements disposed in a stationary transmission casing and adapted to form torque delivery paths between a driving member and a driven member, said driving member being connected to a first element of said gear unit and said driven member being connected to second element thereof, said gear unit including a reaction element, fluid pressure operated unidirectional coupling means for forming a one-way torque reaction delivery path between said reaction element and said stationary casing during operation of said mechanism in a relatively low speed ratio, fluid pressure operated clutch means for connecting together two elements of said mechanism for rotation in unison thereby establishing relatively high speed ratio operation, a fluid pressure source, conduit structure including first and second portions connecting respectively said source with said clutch means and said coupling means, first and second distributor valve means disposed respectively in said first and second conduit structure portions for controlling selectively the distribution of pressure from said source to said clutch means and said coupling means, a branch passage between said clutch means and said second distributor valve means and responding to a clutch pressure build-up to control distribution of pressure from said source to said coupling means, said second distributor valve being adapted to trigger application of said coupling means at a time prior to engagement of the clutch means following initiation of a low speed ratio to a high speed ratio shift sequence, a double acting fluid pressure operated friction brake adapted to anchor said reaction element and a friction brake operating servo having a movable brake operating member defining in part a brake apply chamber and a brake release chamber that are in communication with said source, said brake apply chamber being pressurized continuously by said pressure source and said brake release chamber being in fluid communication with said clutch means.

12. In a multiple speed power transmission mechanism having a gear unit with gear elements disposed in a transmission casing and adapted to form torque delivery paths between a driving member and a driven member, said driving member being connected to a first element of said gear unit and said driven member being connected to a second element thereof, said gear unit including a reaction element, fluid pressure operated unidirectional coupling means forming in part a one-way torque reaction delivery path between said reaction element and said stationary casing during operation of said mechanism in a low speed ratio, fluid pressure operated clutch means for connecting together two elements of said mechanism for rotation in unison thereby establishing relatively high speed ratio operation, a fluid pressure source, conduit structure including first and second portions connecting respectively said source with said clutch means and said coupling means, separate pressure distributor valves disposed in and partly defining each conduit structure portion, a flow restricting orifice connecting said first conduit structure portions and a first distributor valve for said coupling means, a second of said distributor valves controlling selectively the distribution of pressure from said source to said clutch means, said first distributor valve responding to a clutch pressure build-up to control distribution of pressure from said source to said coupling means, said first distributor valve being adapted to trigger application of said coupling means at a time prior to engagement of the cltuch means following initiation of a low speed ratio to a high speed ratio shift sequence, and a fluid pressure responsive friction brake means for anchoring said reaction element to complement the braking action of said coupling means, said friction brake means including a fluid pressure operated brake servo having a movable brake operating member defining in part a brake apply chamber and a brake release chamber, said brake apply chamber being pressurized continuously by said pressure source and said brake release chamber being in fluid communication with said clutch means.

13. In a multiple speed power transmission mechanism having a gear unit with gear elements disposed in a transmission casing and adapted to form torque delivery paths between a driving member and a driven member, said driving member being connected to a first element of said gear unit and said driven member being connected to a second element thereof, said gear unit including a reaction element, fluid pressure operated unidirectional coupling means forming in part a one-way torque reaction delivery path between said reaction element and said stationary casing during operation of said mechanism in a low speed ratio, fluid pressure operated clutch means for connecting together two elements of said mechanism for rotation in unison thereby establishing relatively high speed ratio operation, a fluid pressure source, conduit structure including separate portions connecting respectively said source with said coupling means and said clutch means, a separate distributor valve disposed in each conduit structure portion, a first of said distributor valves controlling selectively the distribution of pressure from said source to said clutch means, a second distributor valve being disposed in fluid communication with the conduit structure portion connected to said clutch means and responding to a clutch pressure build-up to control distribution of pressure from said source to said coupling means, said second distributor valve being adapted to trigger application of said coupling means at a time prior to engagement of the clutch means following initiation of a low speed ratio to a high speed ratio shift sequence, said second pressure distributor valve being adapted to establish and to interrupt alternately communication between said coupling means and said pressure source, said second pressure distributor valve being urged to a communication establishing position in response to a pressure build-up in said clutch means.

14. In a multiple speed power transmission mechanism having gear elements disposed in a transmission casing and adapted to form torque delivery paths between a driving member and a driven member, said driving member being connected to a first gear element and said driven member being connected to a second gear element, said mechanism including a reaction element, fluid pressure operated unidirectional coupling means forming in part a one-way torque reaction delivery path between said reaction element and said casing during operation of said mechanism in a low speed ratio, fluid pressure operated clutch means for connecting together two elements of said mechanism for rotation in unison thereby establishing relatively high speed ratio operation, a fluid pressure source, conduit structure including first and second portions connecting respectively said source with said clutch means and said coupling means, separate pressure distributor valves disposed in and partly defining each conduit structure portion, a flow restricting passage connecting said first conduit structure portion and a first distributor valve for said coupling means, a second of said distributor valves controlling selectively the distribution of pressure from said source to said clutch means, said first distributor valve responding to a clutch pressure build-up to control distribution of pressure from said source to said coupling means, said second distributor valve being adapted to trigger application of said coupling means at a time prior to engagement of the clutch means following initiation of a low speed ratio to a high speed ratio shift sequence, and a fluid pressure responsive friction brake means for anchoring said reaction element to complement the braking action of said coupling means, said friction brake means including a fluid pressure operated servo disposed in fluid communication with said clutch means, said friction brake servo comprising a movable actuator that is urged to a release position upon a clutch pressure build-up in said clutch means, said second pressure distributor valve being adapted to establish and to interrupt alternately communication between said coupling means and said pressure source, said second pressure distributor valve being urged to a communication establishing position in response to a pressure build-up in said clutch means.

15. In a multiple speed power transmission mechanism having gear elements disposed in a stationary transmission casing and adapted to form torque delivery paths between a driving member and a driven member, said driving member being connected to a first gear element and said driven member being connected to a second gear element, said mechanism including a reaction element, fluid pressure operated unidirectional coupling means forming in part a one-way torque reaction delivery path between said reaction element and said stationary casing during operation of said mechanism in a low speed ratio, fluid pressure operated clutch means for connecting together two elements of said mechanism for rotation in unison thereby establishing a relatively high speed ratio operation, a fluid pressure source, conduit structure including separate portions connecting respectively said source with said coupling means and said clutch means, a separate distributor valve means disposed in each conduit structure portion for controlling selectively the distribution of pressure from said source to said clutch means and said coupling means, a fluid pressure accumulator having a movable accumulator member defining in part an accumulator chamber, and a flow restricting branch passage portion interconnecting said clutch means and the distributor valve means for said coupling means whereby the pressure in the region in the said clutch means acts upon and triggers said last-named distributor valve means, said accumulator chamber being in communication with said branch passage means.

16. In a multiple speed power transmission mechanism having gear elements disposed within a casing adapted to form torque delivery paths between a driving member and a driven member, said driving member being connected drivably to a first gear element and said driven member being connected drivably to a second gear element, said mechanism including a reaction element, releasable coupling means for providing a unidirectional torque reaction delivery path between said reaction element and said casing during operation of said mechanism in a low speed ratio, fluid pressure operated clutch means for connecting together two elements of said mechanism for rotation in unison thereby establishing relatively high speed ratio operation, a fluid pressure source, conduit structure interconnecting said source with said fluid pressure operated clutch means and said coupling means, a first pressure distributor valve disposed in and partly defining said conduit structure for controlling distribution of fluid pressure to said clutch means, said clutch means and said coupling means being disposed in separate regions of conduit structure, a flow restricting branch passage interconnecting said regions, said coupling means responding to the pressure in its conduit structure region at a time prior to engagement of said clutch means following initiation of a low speed ratio to a high speed ratio shift sequence, a fluid pressure operated friction brake means for anchoring said reaction element to complement the action of said first mentioned brake means, said friction brake means including a double acting servo having a brake apply pressure chamber and brake release pressure chamber, said pressure chambers being defined in part by a movable brake apply member, said pressure release chamber being in fluid communication with said clutch means, a fluid flow restriction situated between said first distributor valve and said clutch means whereby the fluid flow path between said pressure source and said clutch means is restricted to a higher degree than the fluid flow path between said source and said friction brake servo.

17. In a multiple speed power transmission mechanism having gear elements disposed within a casing and adapted to form torque delivery paths between a driving member and a driven member, said driving member being connected drivably to a first gear element and said driven member being connected drivably to a second gear element, said mechanism including also a reaction element, releasable coupling means for providing a unidirectional torque reaction delivery path between said reaction element and said casing during operation of said mechanism in a low speed ratio, fluid pressure operated clutch means for connecting together two elements of said mechanism for rotation in unison thereby establishing a relatively high speed ratio operation, a fluid pressure source, conduit structure having separate portions respectively connecting said source with said fluid pressure operated clutch means and said coupling means, a first pressure distributor valve disposed in and partly defining a first conduit structure portion for controlling distribution of fluid pressure to said clutch means, a second pressure distributor valve disposed in and partly defining a second conduit structure portion for controlling distribution of pressure to said coupling means, said clutch means and said coupling means being disposed in separate regions of the conduit structure, a flow restricting branch passage interconnecting said regions, said coupling means responding to the pressure in its conduit structure region at a time prior to engagement of said clutch means following initiation of a low speed ratio to a high speed ratio shift sequence, and a release valve means disposed in said second conduit structure portion for establishing and disestablishing communication between said source and said coupling means, said second distributor valve element being responsive to pressure build-up in said clutch means to open said second conduit structure portion when said clutch pressure reaches a predetermined buildup during a low speed ratio to a high speed ratio shift interval, a bypass passage extending from an area on said release valve means to a high pressure region of said conduit structure, an exhaust port in said release valve means, said exhaust port and said bypass passage being respectively opened and closed upon movement of said release valve means, said branch passage communicating with said release valve means said release valve means being adapted to respond to a pressure build-up in the region of said clutch means to open said second conduit structure portion as said clutch means becomes pressurized.

18. In a multiple speed power transmission mechanism having gear elements disposed within a stationary casing adapted to form torque delivery paths between a driving member and a driven member, said driving member being connected drivably to a first gear element and said driven member being connected drivably to a second gear element, said mechanism including a reaction element, releasable coupling means for providing a unidirectional torque reaction delivery path between said reaction element and said casing during operation of said mechanism at a relatively low speed ratio, fluid pressure operated clutch means for connecting together two elements of said mechanism for rotation in unison thereby establishing relatively high speed ratio operation, a fluid pressure source, conduit structure having separate portions respectively connecting said source with said fluid pressure operated clutch means and said coupling means, a first pressure distributor valve disposed in and partly defining one conduit structure portion for controlling distribution of fluid pressure to said clutch means, a second pressure distributor valve disposed in and partly defining the other conduit structure portion for controlling distribution of fluid pressure to said coupling means, and a fluid pressure operated friction brake means for anchoring said reaction element to complement the braking action of said coupling means, said friction brake means including a fluid pressure responsive brake servo having a fluid pressure operated portion movable to a friction brake release position in response to a fluid pressure build-up therein, said friction brake servo being in fluid communication with said clutch means whereby said friction brake servo is urged to a brake release position in sequence with the application of said clutch means, a release valve disposed in said one conduit structure portion, a branch passage connecting said release valve and said first distributor valve to said clutch means, said release valve and said first distributor valve responding to a pressure build-up in said clutch means to block said other conduit structure portion and to exhaust said coupling means when the pressure in said clutch means reaches a calibrated value during a low speed ratio to a high speed ratio shift interval, and a bypass passage extending from a high pressure region of said conduit structure to said release valve, said release valve having an area thereon that is subjected to the pressure in said bypass passage when it assumes one position, said release valve blocking said bypass passage when it assumes another position.

References Cited by the Examiner
UNITED STATES PATENTS

| | | | |
|---|---|---|---|
| 2,001,810 | 5/1935 | Zwald | 188—82.3 |
| 2,537,270 | 1/1951 | Haseltine | 188—82.3 |
| 2,693,260 | 11/1954 | Lucia | 74—761 |
| 2,856,794 | 10/1958 | Simpson | 74—763 |
| 2,981,125 | 4/1961 | Dodge | 74—763 |
| 3,053,107 | 9/1962 | Winchell. | |
| 3,099,172 | 7/1963 | Jania et al. | |
| 3,101,011 | 8/1963 | Tuck et al. | |

DON A. WAITE, *Primary Examiner.*